United States Patent [19]

Ebrahim et al.

[11] Patent Number: 5,848,423
[45] Date of Patent: Dec. 8, 1998

[54] GARBAGE COLLECTION SYSTEM AND METHOD FOR LOCATING ROOT SET POINTERS IN METHOD ACTIVATION RECORDS

[75] Inventors: Zahir Ebrahim, Mountain View; Ahmed H. Mohamed, Berkeley, both of Calif.

[73] Assignee: Sun Microsystems, Inc., Palo Alto, Calif.

[21] Appl. No.: 842,067

[22] Filed: Apr. 23, 1997

[51] Int. Cl.⁶ .................................................. G06F 9/00
[52] U.S. Cl. ............................................................. 707/206
[58] Field of Search ........................................ 707/1–200

[56] References Cited

U.S. PATENT DOCUMENTS

| | | | |
|---|---|---|---|
| 4,757,438 | 7/1988 | Thatte et al. | 364/200 |
| 4,907,151 | 3/1990 | Bartlett | 364/200 |
| 4,920,483 | 4/1990 | Pogue et al. | 364/200 |
| 4,989,134 | 1/1991 | Shaw | 707/206 |
| 5,088,036 | 2/1992 | Ellis et al. | 707/206 |
| 5,222,221 | 6/1993 | Houri et al. | 395/375 |
| 5,301,288 | 4/1994 | Newman et al. | 395/400 |
| 5,355,483 | 10/1994 | Serlet | 395/650 |
| 5,408,650 | 4/1995 | Arsenault | 395/575 |
| 5,535,329 | 7/1996 | Hastings | 395/183.11 |
| 5,560,003 | 9/1996 | Nilsen et al. | 707/206 |
| 5,561,786 | 10/1996 | Morse | 395/497.01 |
| 5,566,321 | 10/1996 | Pase et al. | 395/480 |
| 5,687,368 | 11/1997 | Nilsen | 707/103 |
| 5,692,185 | 11/1997 | Nilsen et al. | 707/104 |

OTHER PUBLICATIONS

Moon, David A., "Garbage Collection in a Large Lisp System", ACM (1984), pp. 235–246.

Aho, Alfred V., et al., "Compilers Principles, Techniques, and Tools," Addison–Wesley, Mar. 1988, Ch. 10, pp. 585–586, 592–599, 605–607.

Karen, et al., "Garbage Collection for Prolog Based on WAM", Communications of the ACM, vol. 31, Issue 6 (Jun. 1, 1988).

Courts, Robert, "Improving Locality of Reference in a Garbage–Collecting Memory Management System", Communications of the ACM, vo. 31, No. 9 (1988), pp. 1128–1138.

Grehan, Rick, "Hands On, Some Assembly Required; If Memory Serves . . . ", Byte (Aug. 1989), pp. 279–280, 282, 284, 337.

(List continued on next page.)

*Primary Examiner*—Thomas G. Black
*Assistant Examiner*—John G. Mills, III
*Attorney, Agent, or Firm*—Gary S. Williams; Flehr Hohbach Test Albritton & Herbert LLP

[57] ABSTRACT

In an object oriented computer system, a root set of object references includes object references stored in the computer system's registers, as well as object references stored in activation records in the program stack. Whenever a method is invoked, a corresponding activation record is stored on the program stack. The activation record includes the invocation address for the method called as well as parameters passed to the called method. A class loader, which loads object classes into memory, determines the locations of the object references in the activation records associated with each method in a loaded object class. A list of offset values for each method activation record is stored by the class loader in a hash table data structure at a location in the hash table data structure determined by hashing the unique invocation address assigned to the method. At the beginning of each garbage collection cycle, a root set locator procedure processes each activation record in the program stack by applying a hash function to the invocation address in the activation record to determine where in the hash table data structure to locate the object reference offsets for that activation record. Using the located object reference offsets, each of the object references in the activation record is added to a root set list. The number of processor cycles required to locate and copy all the object references in activation records in the program stack is a linear function of the number of such object references.

16 Claims, 10 Drawing Sheets

OTHER PUBLICATIONS

Grehan, Rick, "Hands On, Some Assembly Required; Virtually Virtual Memory", Byte (Sep. 1990), pp. 455–456, 458, 460, 462, 464.

Kuechlin, Wolfgang W., "On Multi–Threaded List–Processing and Garbage Collection", IEEE (1991), pp. 894–897.

Booch, Grady, "Object Oriented Design with Applications", Benjamin/Cummings (1991).

Imai, Akira, et al., "Evaluation of Parallel Copying Garbage Collection on a Shared–Memory Multiprocessor", IEEE (1993), pp. 1030–1040.

Holzle, Urs, et al., "A Fast Write Barrier for Generational Garbage Collectors"Oopsla '93 Garbage Collection Workshop (Oct. 1993).

Bott, Ed. Windows; Windows' Invisible Wall: The 64K Barrier, System Resources are the Hidden Memory Limit that Microsoft Forgot:, PCContact (Mar. 1994), pp. 210, 212.

Shaw, Richard Hale, "An Introduction to the Win32 API", PC Magazine vol. 13, No. 8, pp. 291–295.

Barrett, David A., "Improving the Performance of Conservative Generational Garbage Collection", 1995 Thesis.

Wilson, Paul R., et al., "Dynamic Storage Allocation: A Survey and Critical Review", *University of Texas at Austin*, 1995.

Jones, Richard et al., "Garbage Collection, Algorithms for Automatic Dynamic Memory Management", John Wiley & Sons (1996).

Gadbois, David et al., "GC FAQ", http://www.centerline.com/people/chase/GC/GC–faq.html (Jan. 6, 1997).

Caro, Alejandro, "A Novel 64 Bit Data Representation for Garbage Collection and Synchronizing Memory", *Computation Structures Group Memo* 396 (Apr. 9, 1997).

Harbaugh, Sam et al., "HeapGuard™, Eliminating Garbage Collection in Real–Time Ada Systems", *Integrated Software, Inc.,* pp. 704–708.

Wallace, David Vinayak et al., "Simple Garbage Collection in G++", Draft, Rev. 1.1.

Jones, Richard et al., "Garbage Collection, Algorithms for Automatic Dynamic Memory Management", *John Wiley & Sons,* Chs. 6, 7 and 8.

List of entries for which Hash(IA) = Adr(275'-1): 1, 2, 3, 4,6

List of entries for which Hash(IA) = Adr(275'-2): 5, 7, 8

List of entries for which Hash(IA) = Adr(275'-6): 9

List of entries for which Hash(IA) = Adr(275'-9): 10

GARBAGE COLLECTION SYSTEM AND METHOD FOR LOCATING ROOT SET POINTERS IN METHOD ACTIVATION RECORDS The present invention relates generally to "garbage collection" systems and methods that automatically recover memory used by objects no longer in use by the operating system and application programs in a computer system, and more particularly to a system and method for efficiently locating object references in the program stack during garbage collection.

BACKGROUND OF THE INVENTION

Basic Explanation of Garbage Collection

Garbage collection is a complex topic that has been the subject of hundreds of technical articles and at least one text book. The following is a simplified explanation of dynamic memory allocation and garbage collection. For a more complete explanation of basic garbage collection technology, see U.S. Pat. No. 5,088,036, and Richard Jones and Rafael Lins, "Garbage Collection," John Wiley & Sons Ltd., 1996, both of which are incorporated by reference as background information.

Referring to FIG. 1, there is shown a typical multitasking computer system 100 that has a CPU 102, user interface 106, and memory 108 (including both fast random access memory and slower non-volatile memory). The memory 108 stores an operating system 110 and one or more mutator tasks 112 (also called processes or threads). Each active task in the system is assigned a portion of the computer's memory, including space for storing the application level code 112 executed by the task, space for storing a program stack 114, and a heap 116 that is used for dynamic memory allocation.

The program stack 114 need not be in contiguous pages of memory 108, and if not contiguous, the pages or possibly larger contiguous chunks of stack storage are linked together using well known prior art mechanisms.

The CPU 102 includes an instruction cache 120 for providing instructions to an instruction decoder and execution logic 122. The CPU also includes a stack cache 124 for storing in high speed cache memory a portion of the program stack 114, and a set of registers 126 for storing data values, object references 128 and the like. The program stack 114, including the portion in the stack cache 124, is used to temporarily store various data structures and parameters, including activation records (sometimes called "frames") 130 that are pushed on the program stack each time a method or other procedure is invoked.

During garbage collection, the program stack 114 and the registers 126 in the CPU 102 are typically used to locate a "root set" of object references or pointers used by the mutator task 112. A root set locator procedure in the garbage collector will typically generate and store a root set list 132 of the located root set object references.

It should be understood that FIG. 1 depicts only a simplified representation of a CPU 102 and the items stored in memory. Also, it should be understood that multiple processes may be executing simultaneously in a computer system, each with its own address space that includes the same types of items as shown in the memory 108 of FIG. 1.

For the purposes of this description, the terms "task", "mutator", "mutator thread", "thread" and "process" are used interchangeably. Tasks and programs are sometimes called mutators because they change or "mutate" the contents of the heap 116.

The term "object" is herein defined to mean any data structure created by a program or process.

The terms "reference" and "object reference" are used interchangeably to describe a data structure that includes a pointer to an object. While the term "pointer" or "object pointer" are sometimes used interchangeably with "reference" and "object reference", object references may include information in addition to a pointer. An object reference may be direct or indirect. A direct object reference directly points to an object header, while an indirect object reference points to an object handle. In this document the term "object reference" refers to both types.

When the mutator task 112 associated with the heap 116 needs space for storing an array or other program "object", a Memory Allocator routine 140 in the operating system is called. The memory allocator 140 responds by allocating a block of unused memory in the heap 116 to the task. Additional requests for memory will result in the allocation of additional memory blocks. Clearly, if the task continues to ask for more memory, all the space in the heap 116 will eventually be used and the task will fail for lack of memory. Therefore space must be restored by either explicit actions of the program, or some other mechanism.

It is well known that most tasks "abandon" much of the memory space that is allocated to them. Typically, the task stores many program objects in allocated memory blocks, and discards all references to many of those objects after it has finished processing them because it will never need to access those objects again. An object for which there are no references (sometimes called pointers) is often termed an "inaccessible object", and the memory space it occupies is "inaccessible" to the task that once used it.

The solution to this problem is to recover blocks of memory space in the heap 116 that are no longer being used by the task. Garbage collection is the term used to refer to automatic methods of recovering unused memory in the heap 116. The garbage collector generally gathers and recovers unused memory upon the occurrence of a predefined event, such as the expiration of a predefined time period, or usage of a certain amount of the available heap. Thus, FIG. 1 shows that the operation system 110 includes a garbage collector 142.

Thus, the purpose of the garbage collector 142 is to recover unused or abandoned portions of memory in the heap 116 so that the task using the heap will not run out of memory.

While there are a number of different garbage collection methodologies, the easiest one to explain is the Stop and Copy garbage collection technique. In this scheme the heap is divided into two halves, also called semi-spaces, and the program uses only one semi-space at a time. Stop and Copy garbage collectors reclaim unused memory and compact the program accessible memory used by a task by copying all "accessible objects" in the current semi-space to a contiguous block of memory in the other semi-space, and changing all references to the accessible objects so as to point to the new copy of these objects. An accessible object is any object (i.e., block of memory) that is referenced, directly or indirectly, by the "roots" or "root set" of the task. Typically, the "root set" of a task with respect to garbage collection is a set of object references stored in known locations, in the program stack 114 and registers 126 used by the task, which point to objects used by a task. Many of those objects, in turn, will contain references to other objects used by the task. The chain, or directed graph, of object references emanating from the root set indirectly points to all of the accessible objects in the heap.

The entire set of objects referenced by these object references (pointers) is called the set of accessible objects. Inaccessible objects are all objects not referenced by the set of object references derived from the root set.

By copying all accessible objects to a new contiguous block of memory in the heap, and then using the new copy of the objects in place of the old copy, the Stop and Copy garbage collector eliminates all unused memory blocks in the heap. It also "compacts" the memory storage used by the task so that there are no "holes" between accessible objects. Compaction is a desirable property because it puts all of the memory available for allocation to a task in a contiguous block, which eliminates the need to keep track of numerous small blocks of unallocated memory. Compaction also improves virtual memory performance.

Also shown in FIG. 1 are aspects of a computer system that is set up to execute "Java" (a trademark of Sun Microsystems, Inc.) bytecode programs. In particular, the operating system of such a system includes:

a bytecode program verifier 144 for verifying whether or not a specified Java bytecode program satisfies certain predefined integrity criteria;

a class loader 146, which loads object classes into a user's address space and utilizes the bytecode program verifier 144 to verify the integrity of the methods associated with each loaded object class; and a bytecode program interpreter (not shown) for executing Java bytecode programs. If the instruction decoder and execution logic 122 is designed to execute Java bytecode instructions, a bytecode program interpreter is not needed.

Furthermore, in a computer system set up to execute Java bytecode programs, memory 108 will include at least one class repository 150, for locally storing object classes 152 in use and/or available for use by users of the computer system 100. The heap 116 acts as an object repository for storing objects, which are instances of objects of the object classes stored in the class repository 150.

The present invention is equally applicable to systems using incremental garbage collection, which is a collection of techniques for performing garbage collection in a manner that is interleaved in small increments with mutator functions. Incremental garbage collection is used primarily in systems that require real-time system performance. In most copying versions of incremental garbage collection, every time an existing object is accessed, the existing object is copied from old space to new space unless the object has already been moved to new space during the current collection cycle. There are also non-copying and non-compacting versions of incremental garbage collection. Incremental garbage collection reduces the length of any single system pause caused by garbage collection, but may increase latency in the execution of individual mutator task instructions. The procedure or set of instructions used for performing incremental garbage collection are sometimes called "read barrier" instructions, since they are typically performed in conjunction with object field read instructions. Incremental collection may also be performed using write barrier instructions, which are typically performed in conjunction with object reference write instructions.

The present invention is also equally applicable to: any garbage collection system in which method activation records are part of the root set, and to any tracing garbage collection system that needs to quickly and efficiently locate object references in activation records.

Referring to FIG. 2, the stack 114 stores both method activation records (also called stack frames) and computational evaluation data. Each time a new method or procedure is called, a new "stack frame" or activation record 130 is pushed onto the stack 114. In addition, any computational values pushed on the stack during the execution of the "last unterminated procedure" (i.e., the last procedure or method to be called that has not yet executed a return instruction) are pushed onto the end of the stack frame for that procedure. In the preferred embodiment of FIG. 2B, each activation record includes:

a return address program counter value;

a previous stack pointer value (i.e., pointing to the beginning of the preceding stack frame, if any);

a "current evaluation stack base" pointer, which points to the stack location where the first computation evaluation value may be stored in the current stack frame;

a "current evaluation stack top" pointer, which points to the last stack location (if any) where a computation evaluation value has been stored in the current stack frame;

operand parameters 160, 162 associated with the called procedure or method; and local variables 164, 166 associated with the called procedure or method.

A number of registers are used to manage use of the stack. In particular, registers are used to store:

a base frame pointer 170 that points to the base of the stack;

a stack top pointer 172 that points to the top of the stack (i.e., the beginning of the unused portion of the stack);

a current frame pointer 174 that points to the current stack frame; and other pointer and offset values not relevant here.

As shown in FIG. 2, the activation record 130 for an invoked method (or a called procedure or function) is immediately followed by zero or more temporary values, which are computation values that have been pushed onto the stack.

The operating system includes 110 instructions for storing in the program stack 114 an activation record for each method invoked by the mutator task 112. Restated, using conventional terminology, an activation record is pushed onto the program stack each time a method is invoked or a procedure is called. Whenever a procedure exits, the data processor sets its program counter to the return address PC in the current stack frame, the current stack frame is popped from the stack and the previous stack frame becomes the new current frame.

Depending on the method being invoked, one or more of the parameters 160, 162, 164, 166 in the activation record 130 may be object references. Generally, there are a fixed number of parameters in the activation record for each defined method, and there is a fixed, predefined data type for each of the parameters in the activation record. Typical data types include long integer, short integer (16 bit signed integer), single precision floating point, double precision floating point, byte, character, and object reference (sometimes called an object handle).

As indicated above, at the beginning of each garbage collection cycle, the garbage collector 142 must traverse the program stack and registers to locate a root set of object references. Using tagged memory (where supplemental tags are used to identify which memory locations store object references) is generally too expensive to be feasible because a special memory layout is needed to accommodate the tag bit or bits, and because each memory store operation requires a read-modify-write cycle on the memory to update the tags, which significantly impacts the available read and write bandwidth of the computer system, as well as increasing overall cache fill latencies.

The identification of object references in the program stack is a tedious, time consuming task in non-tagged memory based computers. It is especially a problem when time performance guarantees need to be met in real time systems and time critical applications. To enable microprocessors to support real time applications without using explicitly tagged main memory, the present invention provides a method for identifying object references in the stack whose execution time is proportional to the actual number of object references present on the stack, and is not based on the size of the stack (i.e., the number of data words stored on stack at the time garbage collection is performed).

SUMMARY OF THE INVENTION

In summary, the present invention is directed at efficiently identifying a root set object references during garbage collection in a computer system that does not use tagged memory. The root set of object references includes object references stored in the computer system's registers, as well as object references stored in activation records in the program stack. Whenever a method is invoked, a corresponding activation record is stored on the program stack. The activation record includes the invocation address for the method called as well as argument parameters passed to the called method, local variables and other implementation specific information. Each argument parameter and local variable in the activation record has a well defined data type.

The class loader, which loads object classes into memory, determines the locations of the object references in the activation records associated with each method in a loaded object class. This information about the locations of object references in activation records is stored by the class loader as a list of offset or index values for each method activation record in a hash table data structure at the time each object class is loaded into memory. In a preferred embodiment, the location of the offset values in the hash table data structure is determined by hashing the unique invocation address assigned to each method of each loaded object class.

At the beginning of each garbage collection cycle, the garbage collector executes a root set locator procedure that scans the registers and program stack for object references. While scanning the program stack, the root set locator procedure processes each activation record in the program stack by applying a hash function to the invocation address in the activation record to determine where in the hash table data structure to locate the object reference offsets for that activation record. Using the located object reference offsets, the root set locator procedure adds each of the object references in the activation record into a root set list, and then looks for a next activation record in the program stack. Since the locations of the object references in each activation record are known from the offset values stored in the hash table data structure, the number of processor cycles required to locate and copy all the object references in the activation records on the program stack is a linear function of the actual number of object references in the activation records.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
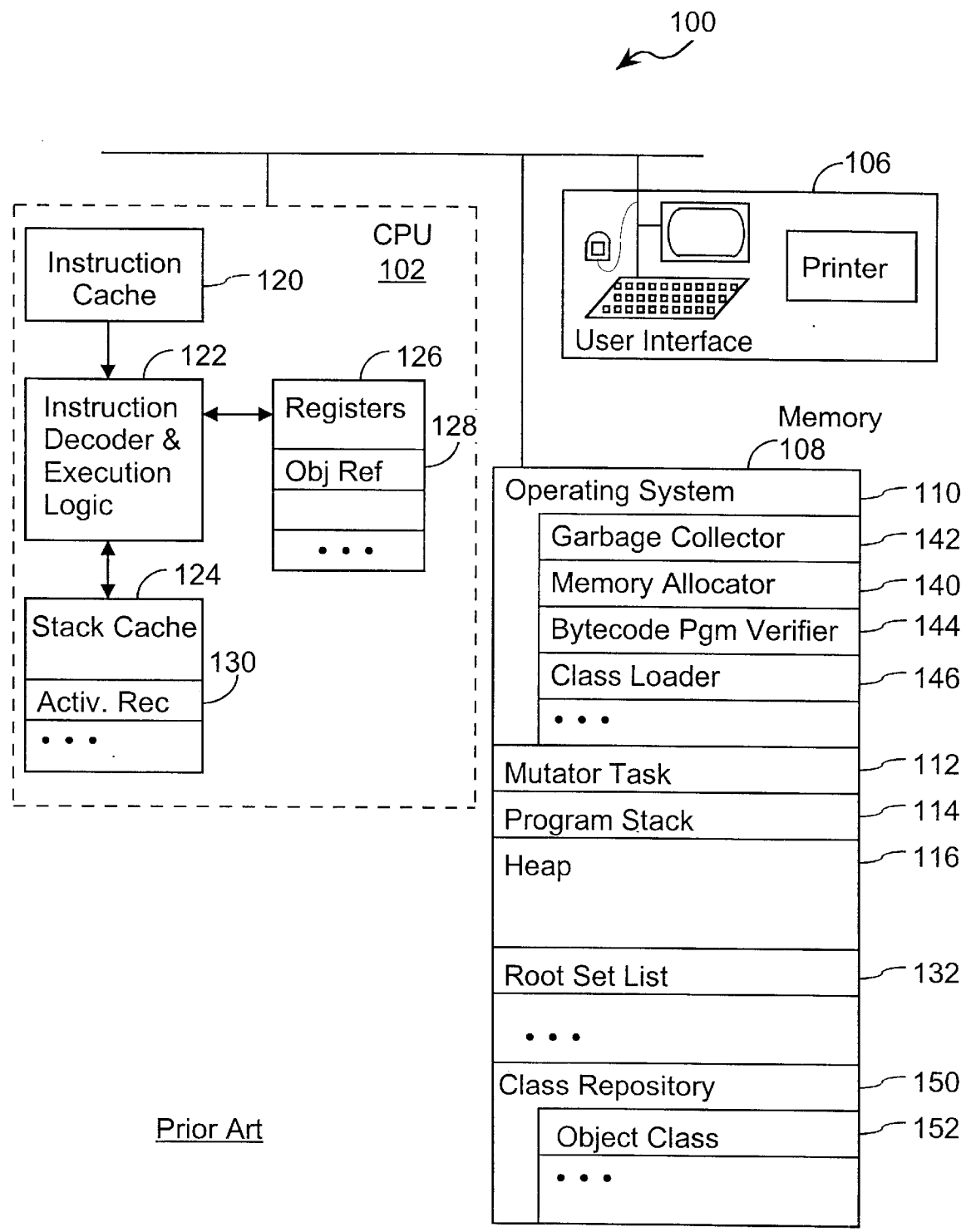
FIG. 1 is a block diagram of a computer system that utilizes garbage collection for recovery of memory space used by inaccessible objects.
Figure 2:
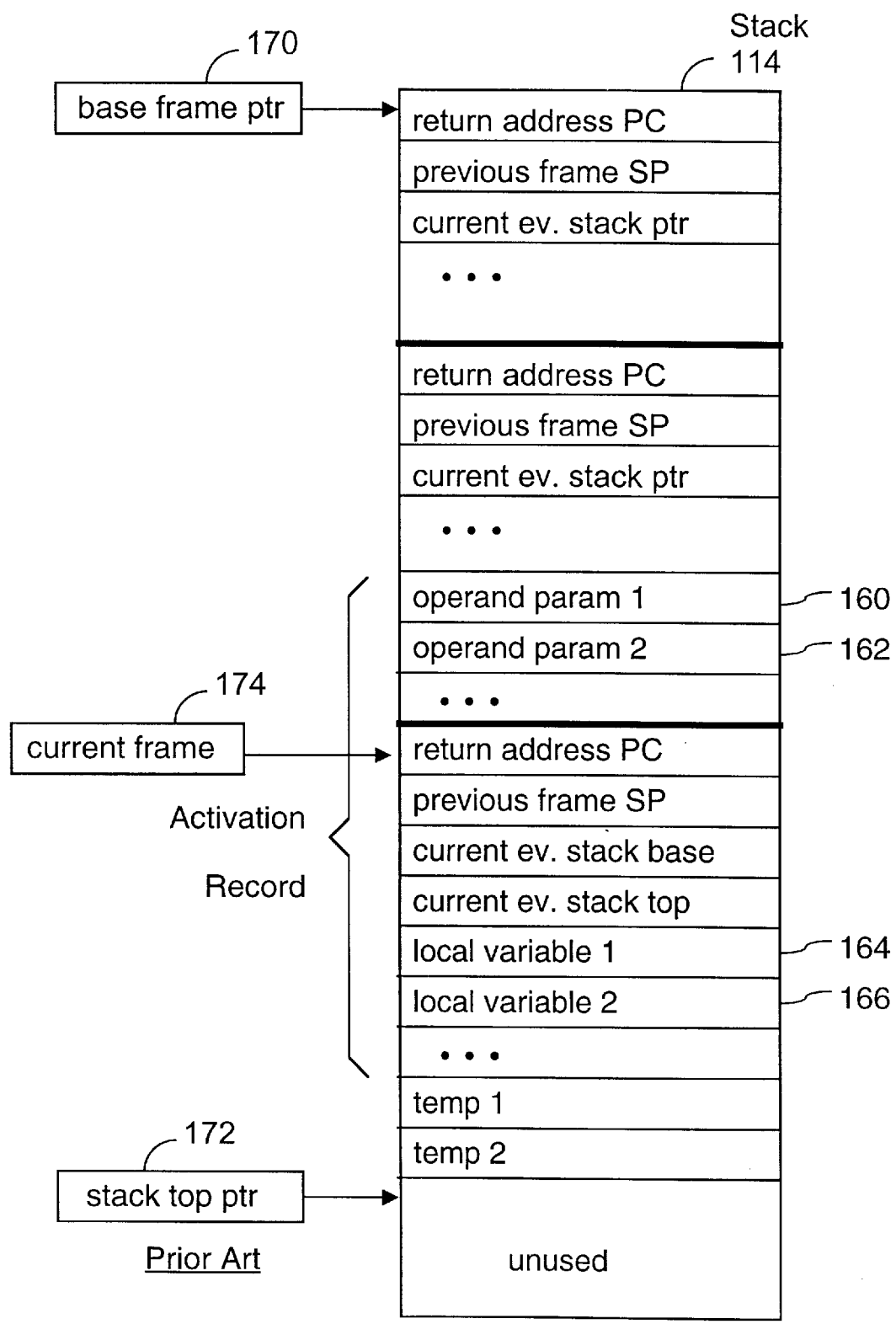
FIG. 2 is a block diagram of the program stack, and activation records stored on the program stack.

In a preferred embodiment, the basic system architecture of FIG. 1 and the activation record structure of FIG. 2 remain fully applicable, except that an additional data value, called the invocation address, is added to each activation record. In a preferred embodiment, the CPU's instruction execution logic pushes the invocation address on the program stack, along with the return address PC and previous frame stack pointer, whenever a method invocation (or procedure call) instruction is executed. Also, additional procedures and data structures are stored in the memory 200 of a computer system using the present invention, and the items in memory in a preferred are shown in FIG. 3A.

For the purposes of this document, the term "method" is used to refer methods (i.e., object class methods) as well as procedures and functions, and the term "method activation record" is used to refer to the record pushed on a stack when any method, procedure or function is called or invoked. While the preferred embodiment is described with respect to a computer system executing Java bytecode methods, the invention is equally applicable to systems executing programs written in other languages, such as C and C++, and to systems using a combination of methods and/or procedures written in a plurality of languages.

The definitions provided near the beginning of this document are applicable to the description of the preferred embodiments.

Figure 3A:
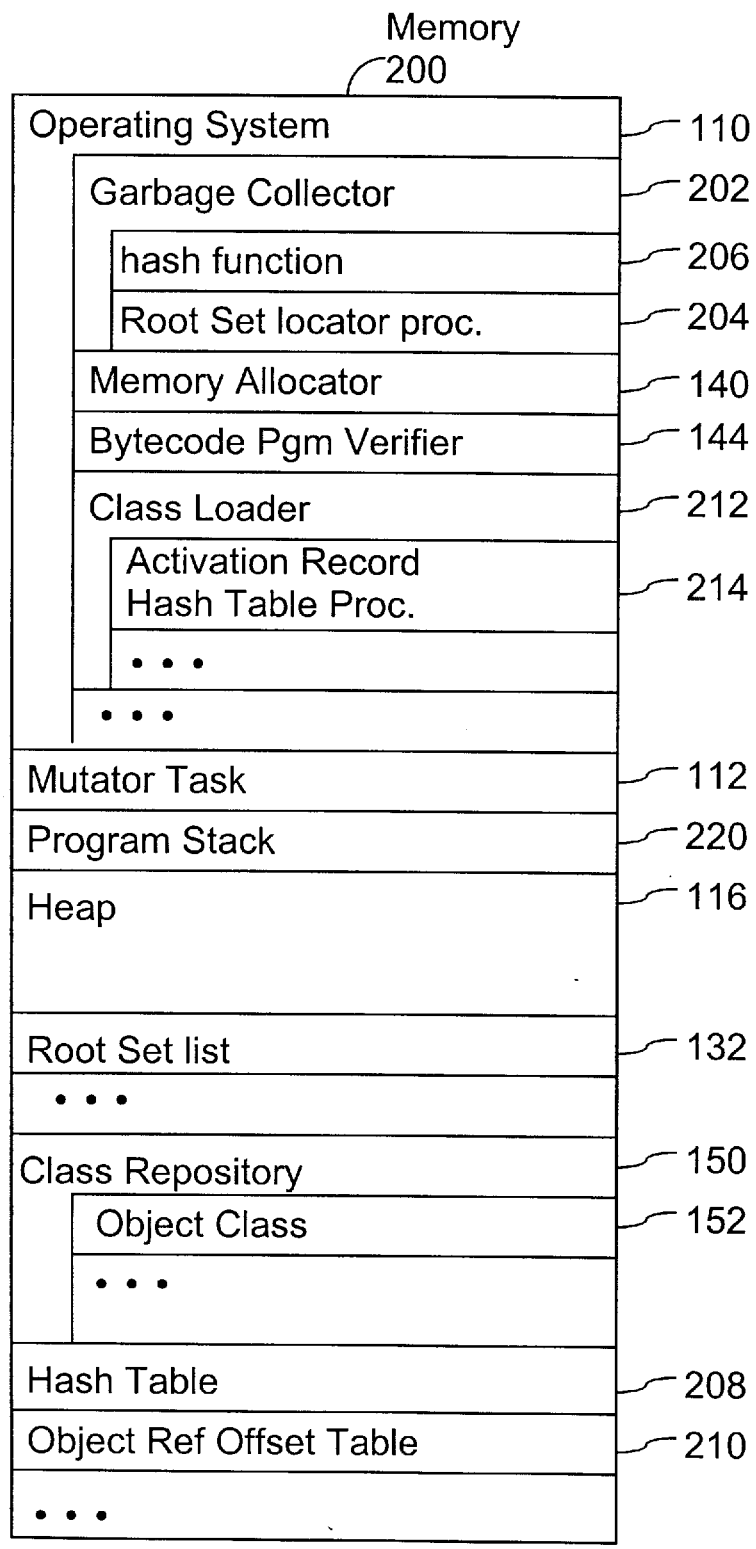
FIG. 3A is a block diagram of the items stored in memory in a preferred embodiment of the present invention.

Referring to FIG. 3A, in the memory 200 of a preferred embodiment, the garbage collector 202 includes a root set locator procedure 204 that utilizes a hash function 206 for determining the location of certain "activation record mapping information" in a hash table 208 and an object reference offset table 210, all of which will be described in more detail below. In addition, the class loader 212 in the preferred embodiment includes an "activation record hash table procedure" 214 for loading the aforementioned activation record mapping information into the hash table 208 and object reference offset table 210 whenever an object class is loaded into memory.

Figure 3B:
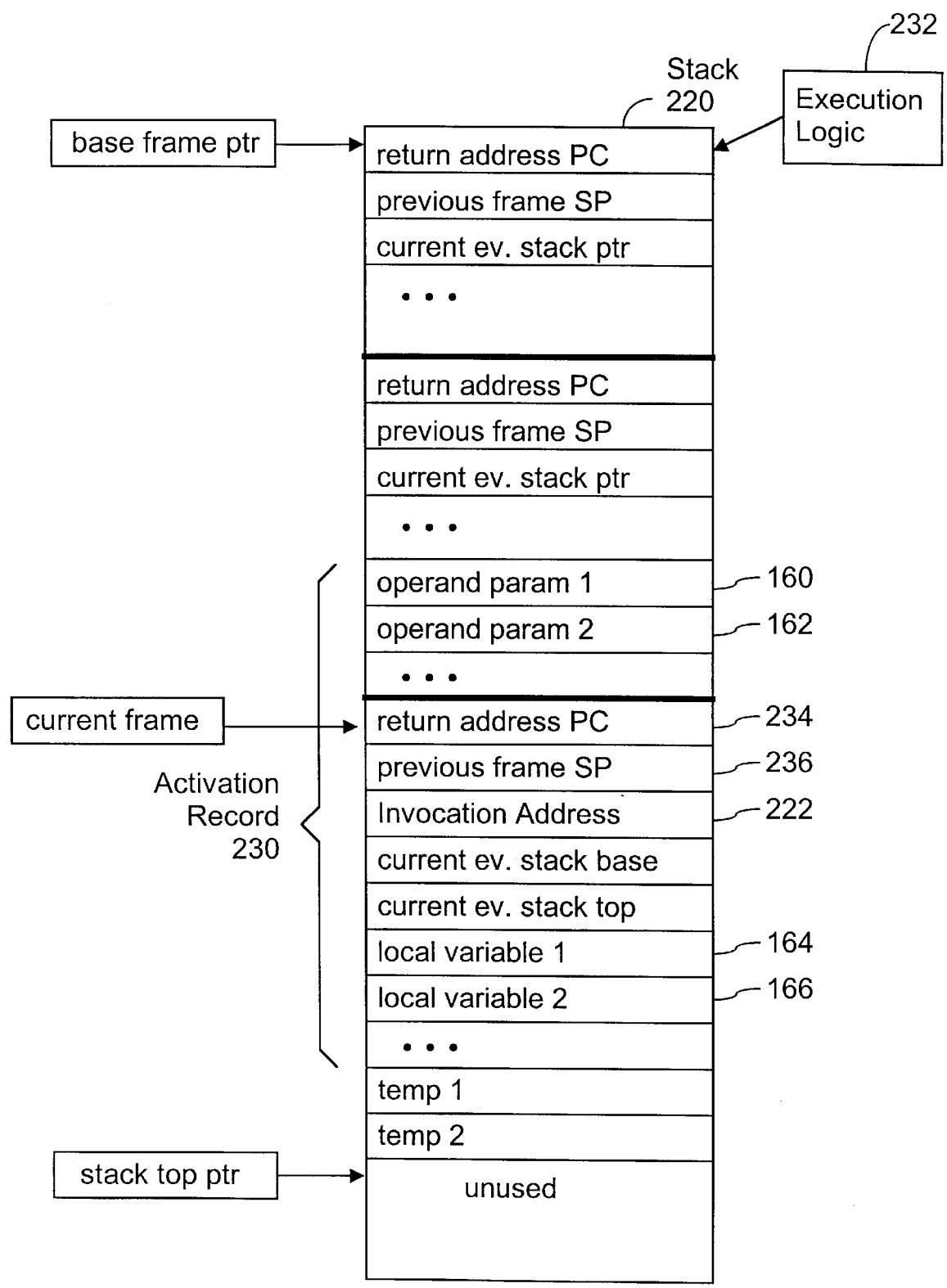
FIG. 3B is block diagram of the program stack, and activation records stored on the program stack in accordance with the present invention.

Referring to FIG. 3B, in the present invention the method invocation address 222 (or an equivalent unique method identifier) is pushed on the stack 220 as part of each method activation record 230. More specifically, the activation record 230 for each called method is generated as follows. The operand parameters 160, 162 for a method are pushed on the stack 220 by the calling method just before executing the method invocation instruction. The CPU's instruction execution logic 232, while executing the method invocation instruction, pushes onto the stack the return address PC 234 (usually the memory location immediately following the method invocation instruction), the previous stack frame pointer 236, and the method invocation address 222. Then compiler generated code pushes the local variables 164, 166 and any implementation specific values onto the stack. In an alternate embodiment, the method invocation address is pushed onto the stack by compiler generated instructions, instead of being automatically pushed onto the stack by the CPU's execution logic 232.

Object Data Structure

Figure 4A:
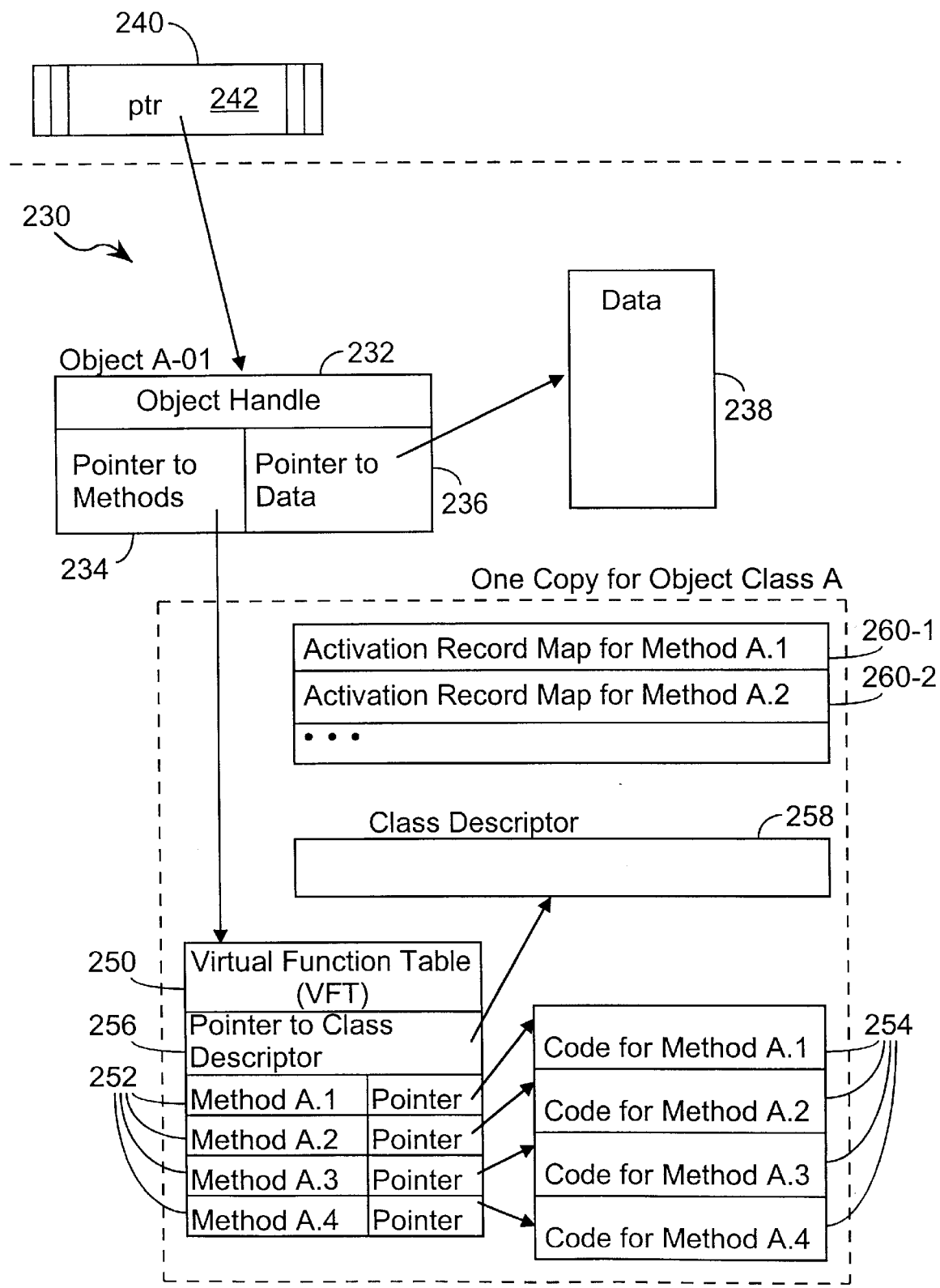
FIGS. 4A and 4B are block diagrams of object data structures.

FIG. 4A shows the data structure 200 for an object in a preferred embodiment of the present invention. This data structure is similar to the object data structure used in some implementations of the Java virtual machine, except that some additional information has been added to a data structure called the class descriptor.

As shown in FIG. 4A, an object 230 of object class A has an object handle 232 that includes a pointer 234 to the methods for the object and a pointer 236 to a data array 238 for the object. The object can be referenced by one or more object references 240, each of which includes a pointer 242 to the object 230. The present invention is equally applicable to systems in which each object, instead being formatted as an object handle with data and method pointers, is formatted instead as an array having an object header followed by a data array, where the object header includes a methods pointer 234 to the methods for the object.

The methods pointer 234 to the object's methods is actually an indirect pointer to the methods of the associated object class. More particularly, the method pointer 234 points to the Virtual Function Table (VFT) 250 for the object's object class. Each object class has a VFT 250 that includes pointers 252 to each of the methods 254 of the object class. The VFT 250 also includes a pointer 256 to a data structure called the class descriptor 258 for the object class. The class descriptor 258 includes data array offsets (not shown) for each of the variables used by the methods of the object class, indicating where in the data array 238 the variable's value is stored.

The class descriptor 258 further contains data representing the data type of every variable and parameter used by each of the methods, including the method call parameters represented in the activation record 230 of each method. From this data type information, the class loader (or one of the procedures called by the class loader, such as the bytecode program verifier) generates an "activation record object reference map" 260 for each method in the object class. The activation record object reference map 260 for a method specifies the following information:

the number of object references stored in the activation record for the method; and the offsets of each of the object references in the activation record for that method.

In the preferred embodiment, the activation record object reference maps 260 are stored temporarily in memory until the information in these maps can be stored by the class loader in the hash table 208 and object reference offset table 210, as will be described in more detail below.

Figure 4B:
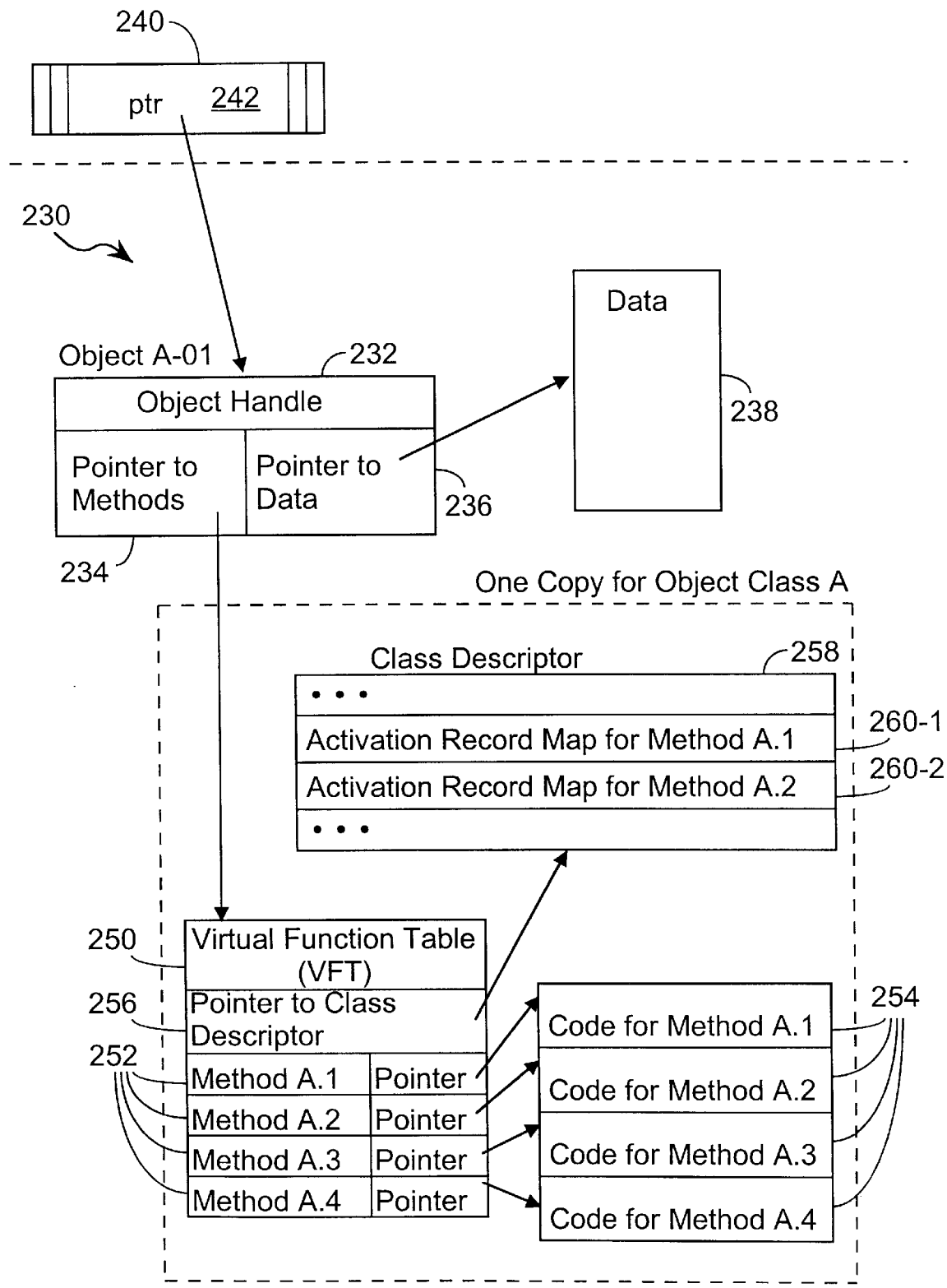

Referring to FIG. 4B, in an alternate embodiment the activation record object reference maps 260 are generated by an object class compiler (not shown) when the methods in the object class are compiled from source code into bytecodes, at which time an object class file is generated that includes the virtual function table 250, the code for the methods 254, and the class descriptor 258. The activation record object reference maps 260 generated by the compiler are stored in the class descriptor 258 portion of the class file, or alternately they can be stored in another data structure in the object class file.

An advantage of generating the activation record object reference maps 260 at run time, as opposed to requiring them to be generated by the object class compiler, is that the class files are smaller. Also, when such class files are stored on publicly accessible servers, the class files are compatible with computer systems using the present invention as well as computer systems not using the present invention.

Regardless of whether the activation record object reference maps 260 are generated at compile time or run time, or whether the source language of the mutator program was Java or any other language such as C or C++, the activation record object reference maps 260 are generated from information (either in the source code program or in the compiled class file) about the data types of the argument parameters and local variables used when calling each of the methods in the object class.

In some embodiments the structure of objects is more complex than shown in FIGS. 4A and 4B, but those additional structural elements are not relevant to the discussion in this document.

Hash Table Structures for Storing Activation Record Information

Figure 5:
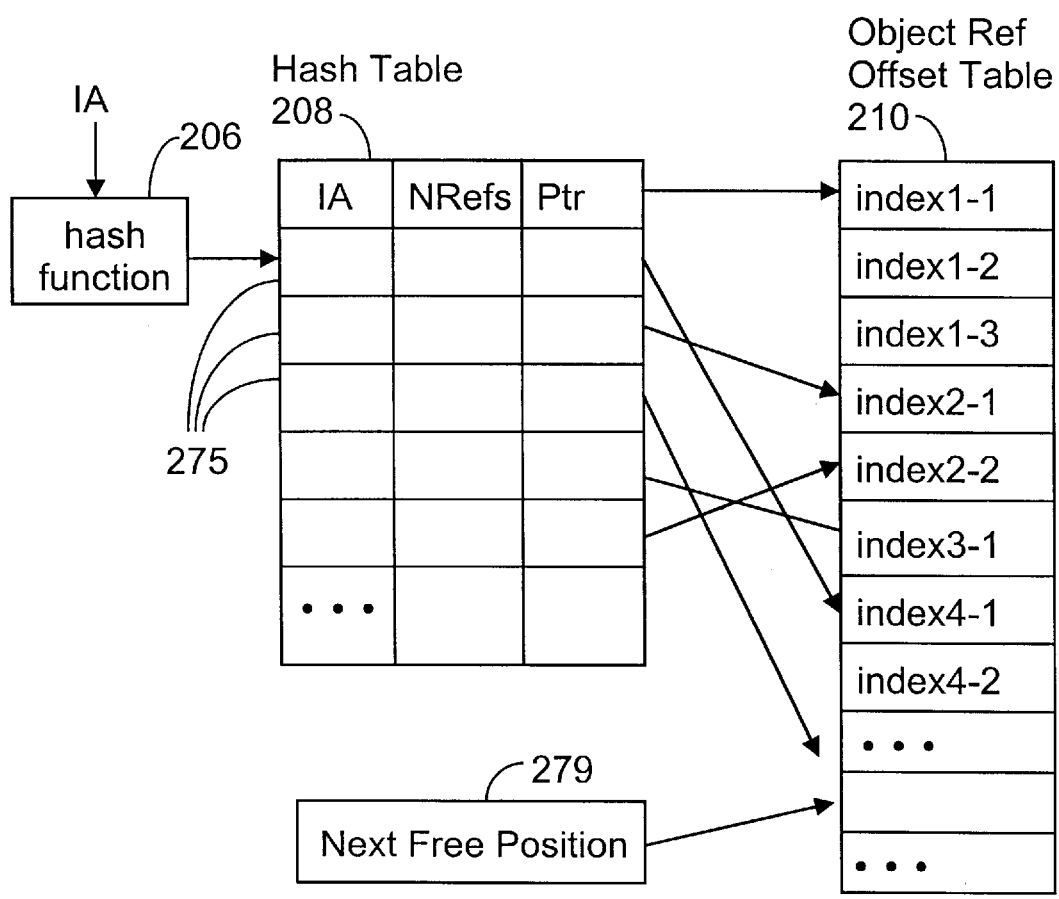
FIG. 5 is a block diagram of the hash table and offset table data structures used in a preferred embodiment of the present invention.
Figure 6:
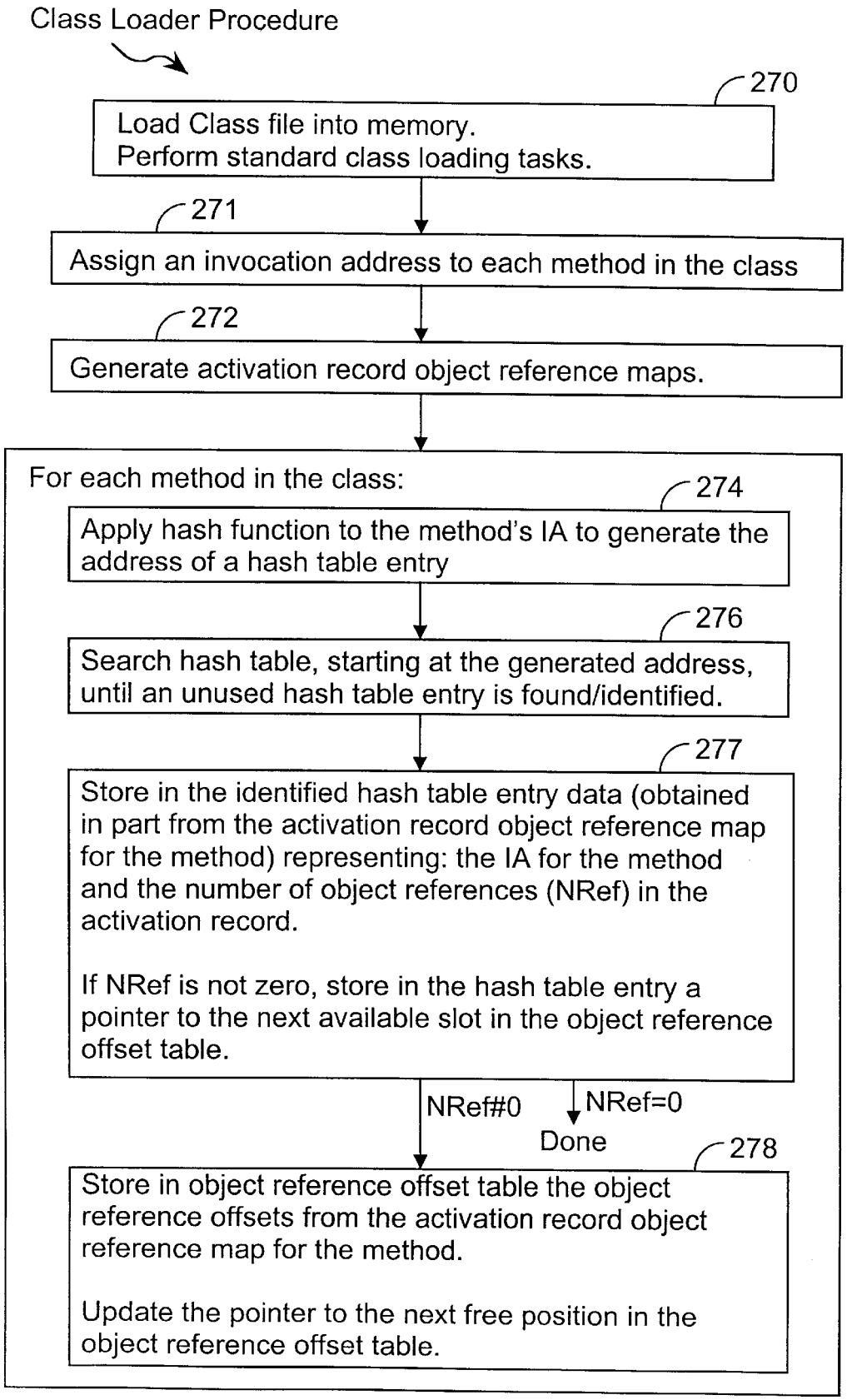
FIG. 6 is a flow chart of the class loader procedure used in a preferred embodiment of the present invention.

Referring to FIGS. 5 and 6, whenever the class loader loads an object class into memory (step 270), an invocation address (IA) is assigned to each method in the class (step 271). If the loaded class file does not already include a set of activation record object reference maps 260, the class loader generates them (step 272). As noted above, the activation record object reference maps 260 could also be generated by the bytecode program verifier 144, which is called by the class loader 212 as part of the process of loading an object class into memory. For non-Java languages such as C or C++, the activation record object reference maps 260 can be generated by the linker, whether dynamic or static.

After these preliminary steps, the class loader stores the information in the activation record object reference maps 260 in a table structure that includes a hash table 208 and object reference offset table 210 as follows (steps 274–278). For each method in the loaded class, a predefined hash function is applied to the method's invocation address so as to generate the address of a hash table entry (274). In other words, the hash function is designed to produce a value, such as a table slot offset address (TSI), that is then converted into a memory address by adding the base address of the table:

TSI=Hash(IA)

address=HashTable_BaseAddress+TSI

The table slot offset address TSI already takes into account the hash table record size so that the computed address always points to the beginning of a hash table record. The two mathematical operations noted above can be considered to together represent a hash function, the application of which to an invocation address generates a hash table entry address.

Next, the hash table is searched linearly in a predefined direction (e.g., toward the end of the table), starting at the hash table slot 275 identified in step 274, and wraps around to the beginning of the table upon reaching its end, and continues the search until an unused hash table entry is found (276). For instance, unused or empty entries can be indicated by an IA value of zero. Typically, if the hash function is well designed and the hash table is properly sized, the initial slot identified in step 274 will usually be empty, eliminating the need to search any further for an empty slot. Also, since the insert operation into the hash table only happens once for each method of each class, doing the search linearly in this way starting from the initially computed hash table index is acceptable.

Figure 8:
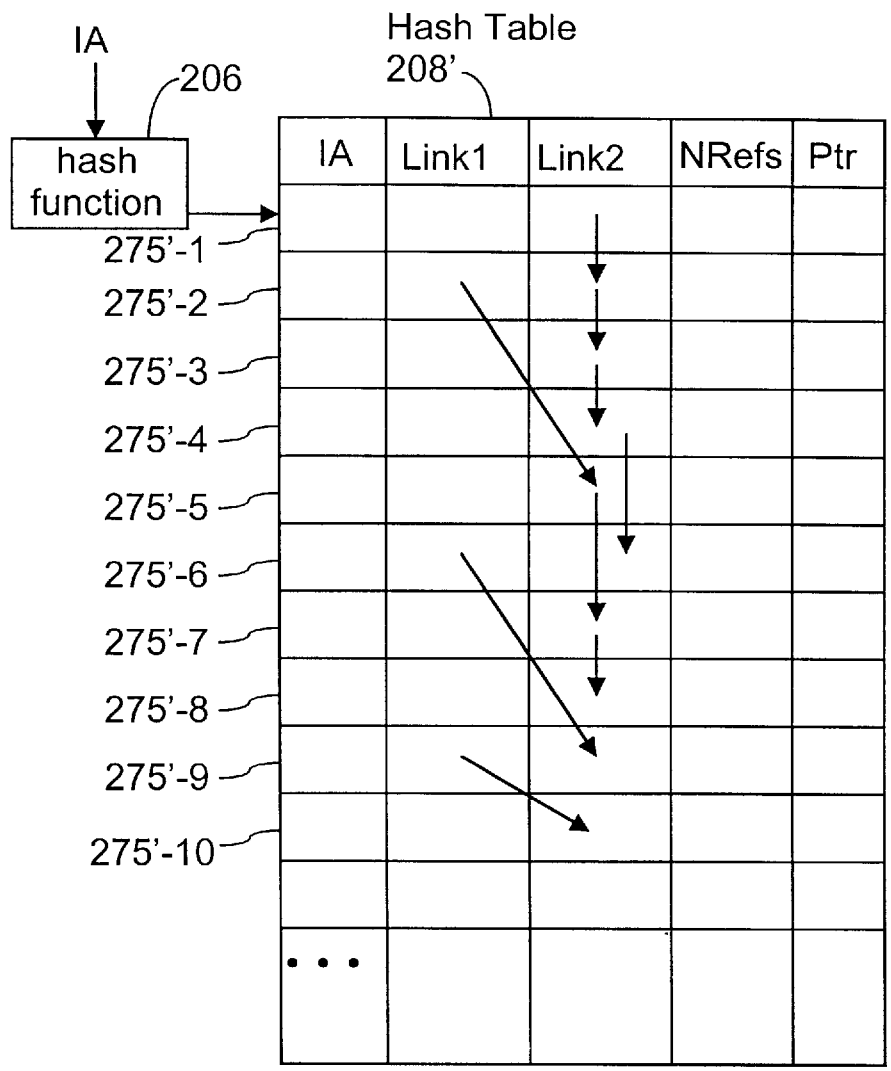
FIG. 8 is a block diagram of an alternate hash table data structure.

However, the hash table lookups by the garbage collector need to be performed very efficiently as such lookups are performed much more frequently, and therefore a hash table structure needs to be selected that can minimize latency when looking up an item displaced by a hash table collision. One such structure is shown in FIG. 8, in which a lookup can be performed in almost constant time and in the worst case is proportional to the actual number of collisions that occur at each hash table index.

The hash table slot or entry found in steps 274 and 276 is filled with data from the corresponding activation record object reference map 260 for the associated method (277). In particular, the data stored in the hash table includes the invocation address (IA) and the number of object references (NRefs) in the activation record. If the number of object references in the activation record is not zero (i.e., NRefs≠0), a pointer 279 to the next available slot in the object reference offset table is copied into the hash table entry 275. If there are no objects reference in the activation record (i.e., NRefs=0) a null pointer (Ptr=null) is stored in the hash table entry.

Next, if the number of object references in the activation record is not zero (NRefs≠0), then the object reference offsets from the activation record object reference map 260 are copied into the object reference offset table at the position identified by the next free position pointer 279, and then the next free position pointer 279 is updated to point to the first unused slot of the offset table (278).

If the hash table 208 becomes excessively full, however that may be measured, or pathologic collisions in the hash table occur, well known prior art techniques are used to increase the size of the hash table and/or apply a different hash function (which will typically require recomputation of the hash table position of all the entries previously stored in the hash table 208).

In summary, the class loader includes instructions for loading information about the location of object references in method activation records into the hash table 208 and offset table 210 for each method in each class that has been loaded. As will be described next, the information in these two tables is then used during garbage collection to efficiently identify object references in the activation records in the program stack.

Root Set Object Reference Locator Procedure

Figure 7:
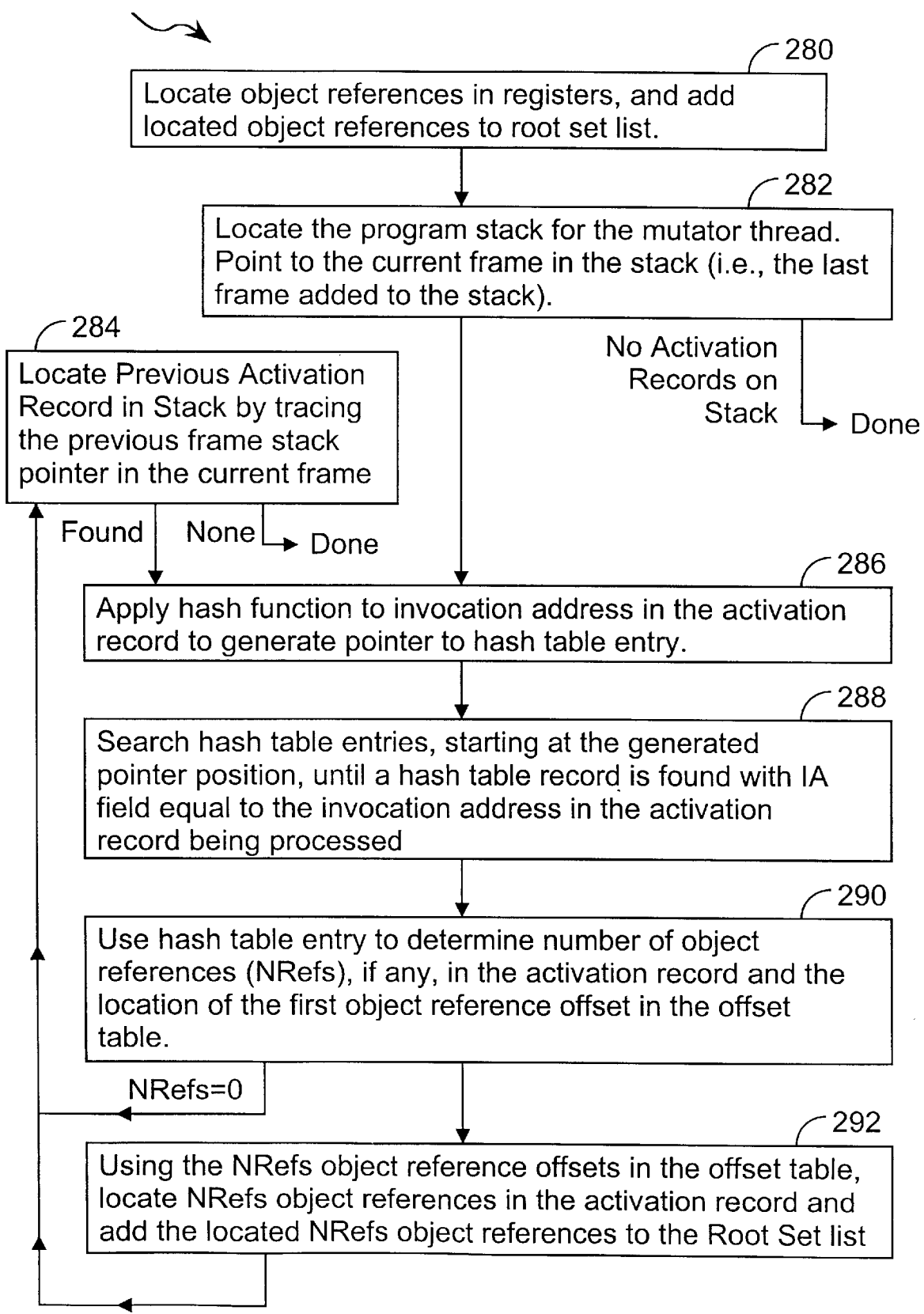
FIG. 7 is a flow chart of the root set locator procedure used in a preferred embodiment of the present invention.

Referring to FIGS. 5 and 7, each time the garbage collector begins a garbage collection root set traversal cycle, it first builds a list of root set object references using a root set locator procedure. For the purposes of this document, it is assumed that the root set object references in the CPU registers are easily located (280) using prior art techniques well known to those skilled in the art, and that this is done either before or after the search for object references in the program stack. A second assumption made here is that either all object references in the program stack are in method activation records as shown in FIG. 2, and/or that any other object references in the program stack outside the activation records are located using prior art techniques well known to those skilled in the art, and therefore the task of finding any of those object references is not addressed in this document.

The root set locator procedure shown in FIG. 7 is repeated for each mutator task, each of which executes as a distinct thread. More particularly, each thread (mutator task) will have its own heap, stack, register values, and the heap for each thread is garbage collected independently of the others.

At step 280, the procedure locates all object references in the mutator task's registers, and adds them to the root set list.

The search for object references in the program stack begins at step 282 by locating the program stack for the mutator task, setting a pointer to the current frame in the program stack, which is the last frame on that program stack. If there are no activation records on the program stack, the procedure exits.

Otherwise, at step 286 the aforementioned hash function is applied the invocation address in the activation record of the stack frame currently being inspected by the root set locator procedure to generate a pointer to a hash table entry (286). Then the hash table entries starting at the address generated at step 286 are searched until a hash table entry matching the invocation address in the activation record is found (288). For the large majority of activation records in the stack, the first hash table entry checked at step 288 will match the activation record's invocation address.

Next, the information in the located hash table entry is used to determine the number of object references (NRefs), if any, in the activation record being processed, and the location of the first object reference offset in the offset table (290). If the hash table entry indicates that the activation record contains no object references, the processing of the activation record is complete and the locator procedure continues by looking for an activation record in the next earlier stack frame in the stack (284), which is located using the previous stack frame pointer in the stack frame last processed by the procedure.

If the hash table entry indicates that the activation record contains at least one object reference, the NRef object reference offsets stored in the offset table 210 for the activation record are used to locate the NRef object references in the activation record 230 being processed by the root set locator procedure. The located NRef object references are added by the root set locator procedure to the root set list (292). Then the root set locator procedure resumes processing at step 284, where it looks for the next earlier activation record in the stack. If the last activation record processed was the first one in the program stack, the procedure exits. Otherwise processing the next earlier activation record continues at step 286.

Table 1 is a pseudocode representation of steps 286, 288, 290 and 292. Table 2 is a pseudocode representation of step 284.

TABLE 1

Pseudocode for locating object references in an activation record

```
/*  Find the Hash Table Slot matching the IA   */
/*  HALAST is a constant pointing to the last entry of the hash table */
TSI = Hash(IA)
HA = HashTable__BaseAddress + TSI
```

TABLE 1-continued

Pseudocode for locating object references in an activation record

```
While HA.IA ≠ IA
    {
    If HA = HALAST
        {HA = HashTable_BaseAddress}
    Else
        {HA = HA + HashTable_RecordSize}
    }
/*  When the above code completes, HA points to the hash table entry
    for the invocation address */
/*  Locate and add the NRef object references in the activation record
    to the root set list */
If HA.NRefs ≠ 0  {
    For I = 0 to NRefs-1 {
        /*  Get Object Ref's Offset in Activation Record) */
        /*  NB is the number of bytes used by each offset table entry */
        RefLoc = OffsetTable(HA.Ptr + I*NB)
        /*  Copy Object Ref from Activation Record */
        FoundObjectRef = Stack(StackFramePointer + RefLoc)
        Add FoundObjectRef to Root Set List
        }
    }
```

TABLE 2

Pseudocode for locating previous stack frame (step 284)

```
/*  Find the next earlier stack from  */
If StackFramePointer = StackFrameBase
    {exit procedure}
StackFramePointer = StackFramePointer.PreviousStackFramePointer
IA = StackFramePointer.IA
```

In a preferred embodiment, the offset table is organized as a byte array, where each entry in the offset table is one byte (as so NB=1), and can identify up to 255 word offsets (negative or positive) relative to the stack frame pointer, assuming that each entry on the stack is one word. This layout of the offset table is arbitrary and can easily be an array of integers as opposed to an array of bytes. Note that operands are positioned before the stack frame pointer (and thus have negative offsets) while local variable are after it (and thus has positive offsets). Thus, each entry in the offset table is a signed quantity. In Java, which only has unsigned bytes, values between 1 and 127 is used to indicate positive offsets, and values between 128 and 255 are used to indicate negative offsets. In the pseudocode shown in Table 1, Refloc is assumed to be a signed quantity.

As will be shown next, the processor time spent identifying the activation record object references in the program stack is linearly proportional to the number of object references in the program stack's activation records.

If the average number of object references per activation record is Z and the number of activation records on the stack at the time of garbage collection cycle initiation is N, then there are N×Z object references in the stack. Assuming it takes an average of A memory references to locate a first object reference in an activation record, and the subsequent Z−1 object references in the activation record each take B memory references to locate all the object references in an average activation record takes A +B×(Z−1) memory references. For N activation records, locating the object references takes N×(A+B×(Z−1)) memory cycles. If it takes C memory references to store a single object reference to the root set list, then it takes C×N×Z memory references to store all the object references to the root set list. The total time taken to locate and process all the object references in the program stack is: N×(A+B×Z−1))+(C×N×Z) which is a number that is order (N×Z). Note that A, B and C are effectively small constants for any particular implementation.

In the above description, the terms "memory references" and "processor cycles" are used interchangeably to refer to the amount of work done by the garbage collector to generate a root set.

Regardless of the values of A, B and C, it should be noted that the number of processor cycles is a linear function of the number of object references N×Z in the program stack, and it is not a function of the size of the program stack. Because each activation record includes a previous stack frame pointer, the root set locator procedure jumps directly to the next earlier stack frame after copying the object references in the activation record to the root set.

Alternate Embodiments

While the preferred embodiment of the present invention works in the context of a data processor designed to directly execute Java bytecode instructions, the present invention is equally applicable to computer systems executing object oriented programs using other instruction sets.

A number of functionally equivalent data structures could be used in place of the hash table 208 and offset table 210. For instance, instead of storing the number of object references in the hash table, the offset table could store a blank record (i.e., a zero value) to indicate the end of the list of object offsets for each type of activation record.

Another alternate hash table structure 208' is shown in FIG. 8, in which each hash table entry 275' contains two link pointers, Link1 and Link2. The link pointers are used to form linked lists of entries that have the identical hash function value. The Link1 pointer for slot X is used only when an invocation address mapping to slot X must be remapped because slot X is already occupied by an item that is on a collision list starting at another slot Y (i.e., only if the invocation address already in slot X maps to a different table address), in which case the Link1 pointer points to the first table entry for items mapping to slot X. The second link, Link2, is used to form a linked list (a collision list) of items mapping to the same table address as the first item in the list. The advantage of this hash table structure is that the search time for locating an entry 275' matching a particular invocation address (IA) is proportional to the number of entries mapped to the hash table entry.

In this alternate embodiment, the search procedure for finding the hash table entry for a particular IA is shown in Table 3.

TABLE 3

```
TSI = Hash(IA)
HA = HashTable_BaseAddress + TSI
If HA.IA ≠ IA
    /*  If mapped entry HA doesn't match, find first item on the
        collision list */
    {       If Hash(HA.IA) ≠ TSI
                {HA = HA.Link1}
    }
/* If necessary, trace the collision list until matching entry is found */
While HA.IA ≠ IA
    {HA = HA.Link2}
```

Other alternate hash table structures could also be used. For instance, a first link pointer, Link1, could be used in each hash table entry to point to a first collision insertion, while second link pointer, Link2, could be used to point to a list structure external to the hash table when more than one collision occurs on a single hash table entry. The external list structure would list the table locations of all additional items mapping to the same hash table address.

In an alternate embodiment, the invocation address (IA) in each activation record can be replaced by any "method identifier" that uniquely identifies each loaded method. For instance, the IA in each activation record can be replaced by an integer identifying the hash table slot for the method. This "method slot ID" would still uniquely identify each method and would avoid the need for a hash computation during garbage collection. In this alternate embodiment the "method identifier" is pushed on the program stack by software instructions, since the instruction execution logic is unlikely to have direct access to the activation record "method identifier" for each method. Also, in this alternate embodiment, hash table entries are preferably assigned to loaded methods in sequential order starting with the first entry in the hash table, with no hash function being required. This also allows the use of a smaller hash table, due to the high density of used table entries.

For C, C++ and other non-Java language programs, the portion of the present invention related to loading activation record information (i.e., concerning the location of object references in each procedure's activation record) in a hash table can be performed by a program linker instead of the class loader used in computers executing Java bytecode methods. The present invention is equally applicable to C or C++ linker implementations and Java language class loader implementations.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of operating a computer system so as to efficiently locate root set object references for garbage collection of inaccessible objects in the computer system's memory, comprising the steps of:

loading an object class having a plurality of methods into the computer system's memory; each method of the loaded object class having an associated activation record; an instance of which is stored on a program stack in the each method's activation record including a unique identifier associated with the method and zero or more parameters, each of the parameters having an associated data type and location in the activation record that is defined by the loaded object class; wherein a subset of the parameters in the activation records for the methods in the loaded object class are object references having an object reference data type;

while performing the loading step,
      associating each method in the loaded class file with an entry in a table; and
      storing in the table data for each method in the loaded class file, at the associated entry for the method, the stored data indicating where each of the object references, if any, are located in the activation record for the method;

executing a mutator task that stores objects in the computer system's memory;

storing on a program stack an instance of the activation record for each method invoked by the mutator task; and performing garbage collection on objects in memory, including scanning the activation records stored in the program stack to identify object references therein, including processing each activation record in the program stack by:
      locating the entry in the table that corresponds to the activation record being processed; and
      identifying each of the object references in the activation record being processed in accordance with the data stored in the located table entry, whereby objects stored in memory are efficiently identified from parameters in the activation records stored in the program stack.

2. The method of claim 1, wherein
   the unique identifier associated with each method is a unique invocation address assigned to the method when the method is loaded into memory;
   the step of associating a method with a table entry comprises applying a hash function to the method's invocation address so as to generate a value indicative of the table entry; and
   the entry locating step comprises applying the hash function to the invocation address in the activation record being processed so as to generate a value indicative of the table entry corresponding to the activation record being processed.

3. The method of claim 1, further characterized by:
   each activation record including a back pointer to a previous activation record, if any, stored on the program stack;
   the activation record processing step including jumping to the previous activation record pointed to by the back pointer in the activation record after identifying the object references in the activation record being processed;
   whereby portions of the activation records in the program stack that do not store object references are skipped during the step of scanning the activation records stored in the program stack.

4. The method of claim 3, further characterized by:
   the table comprising a two level data structure including a hash table and an offset values table, each utilized entry in the hash table storing (A) data uniquely identifying a corresponding method, and (B) a pointer to a portion of the offset values table; the offset values table storing offset values indicative of the locations of the object references in the activation records associated with the methods loaded into memory;
   the step of associating a method with a table entry including locating an unused entry in the hash, locating an unused portion of the offset values table, and storing in the located hash table entry a pointer to the located portion of the offset values table; and
   the data storing step including storing in the located hash table entry a datum uniquely identifying the method associated with the located hash table entry, and storing in the located portion of the offset values table the data indicating where each of the object references, if any, are located in the activation record for the method.

5. The method of claim 4,
   the step of associating a method with a table entry including, when the activation record for the method does not include any object references, skipping the steps of locating an unused portion of the offset values table and storing in the located hash table entry a pointer to the located portion of the offset values table; and the data storing step including, when the activation record for the method does not include any object references, skipping the step of storing data in the located portion of the offset values table.

6. The method of claim 1, the activation records storing step including, storing as part of each activation record under direct hardware control a return address value, a pointer to a previous activation record, if any, and a method invocation address for the method associated with the activation record.

7. A computer program product for use in conjunction with a computer system, the computer program product comprising a computer readable storage medium and a computer program mechanism embedded therein, the computer program mechanism comprising:

a class loader procedure that loads an object class having a plurality of methods into the computer system's memory; each method of the loaded object class having an associated activation record; each method's activation record including a unique identifier associated with the method and zero or more parameters, each of the parameters having an associated data type and location in the activation record that is defined by the loaded object class; wherein a subset of the parameters in the activation records for the methods in the loaded object class are object references having an object reference data type;

the class loader procedure including:
  instructions for associating each method in the loaded class file with an entry in a table; and
  instructions for storing in the table data for each method in the loaded class file, at the associated entry for the method, the stored data indicating where each of the object references, if any, are located in the activation record for the method;

a mutator task that stores objects in the computer system's memory;

an operating system that includes instructions for storing activation records in the program stack, including an activation record for each method invoked by the mutator task; and a garbage collection procedure that processes the activation records stored in the program stack to identify object references therein, the garbage collection procedure including a root set locator procedure that includes:
  instructions for locating the entry in the table that corresponds to the activation record being processed; and
  instructions for identifying each of the object references in the activation record being processed in accordance with the data stored in the located table entry;

whereby objects stored in memory are efficiently identified from parameters in the activation records stored in the program stack.

8. The computer program product of claim 7, wherein the unique identifier associated with each method is a unique invocation address assigned to the method when the method is loaded into memory;

the table entry associating instructions comprise instructions for applying a hash function to the method's invocation address so as to generate a value indicative of the table entry; and the table entry locating instructions comprises instructions for applying the hash function to the invocation address in the activation record being processed so as to generate a value indicative of the table entry corresponding to the activation record being processed.

9. The computer program product of claim 7, further characterized by:

each activation record including a back pointer to a previous activation record, if any, stored on the program stack;

the garbage collection procedure including instructions for jumping to the previous activation record pointed to by the back pointer in the activation record after identifying the object references in the activation record being processed;

whereby portions of the activation records in the program stack that do not store object references are skipped by the root set locator procedure.

10. The computer program product of claim 9, further characterized by:

the table comprising a two level data structure including a hash table and an offset values table, each utilized entry in the hash table storing (A) data uniquely identifying a corresponding method, and (B) a pointer to a portion of the offset values table; the offset values table storing offset values indicative of the locations of the object references in the activation records associated with the methods loaded into memory;

the table entry associating instructions comprising instructions for locating an unused entry in the hash, locating an unused portion of the offset values table, and storing in the located hash table entry a pointer to the located portion of the offset values table; and the table entry data storing instructions comprising instructions for storing in the located hash table entry a datum uniquely identifying the method associated with the located hash table entry, and storing in the located portion of the offset values table the data indicating where each of the object references, if any, are located in the activation record for the method.

11. The computer program product of claim 10, the table entry associating instructions including instructions for not locating an unused portion of the offset values table and not storing in the located hash table entry a pointer to the located portion of the offset values table when the activation record for the method does not include any object references; and the table entry data storing instruction including instructions for not storing data in the located portion of the offset values table when the activation record for the method does not include any object references.

12. The computer program product of claim 7, the data processor including instruction execution logic for executing method invocation instructions, the instruction execution logic including hardware logic for storing as part of each activation record a return address value, a pointer to a previous activation record, if any, and a method invocation address for the method associated with the activation record.

13. A method of operating a computer system so as to efficiently locate root set object references during garbage collection of inaccessible objects in the computer system's memory, comprising the steps of:

loading methods or procedures into the computer system's memory; each method or procedure having an associated activation record; each method or procedure's activation record including a unique identifier associated with the method or procedure and zero or more parameters, each of the parameters having an associated data type and location in the activation record; wherein a subset of the parameters in the activation records for the loaded methods and/or procedures are object references having an object reference data type;

while performing the loading step,
associating each loaded method or procedure with an entry in a table; and
storing in the table data for each loaded method or procedure, at the associated entry for the method or procedure, the stored data indicating where each of the object references, if any, are located in the activation record for the method or procedure;

executing a mutator task that stores objects in the computer system's memory;

storing on a program stack an instance of the activation record for each method or procedure invoked by the mutator task; and performing garbage collection on objects in memory, including scanning the activation records stored in the program stack to identify object references therein, including processing each activation record in the program stack by:
locating the entry in the table that corresponds to the activation record being processed; and
identifying each of the object references in the activation record being processed in accordance with the data stored in the located table entry, whereby objects stored in memory are efficiently identified from parameters in the activation records stored in the program stack.

14. The method of claim 13, wherein
the unique identifier associated with each method or procedure is a unique invocation address assigned to the method or procedure when the method or procedure is loaded into memory;
the step of associating a method or procedure with a table entry comprises applying a hash function to the method or procedure's invocation address so as to generate a value indicative of the table entry; and
the entry locating step comprises applying the hash function to the invocation address in the activation record being processed so as to generate a value indicative of the table entry corresponding to the activation record being processed.

15. A computer program product for use in conjunction with a computer system, the computer program product comprising a computer readable storage medium and a computer program mechanism embedded therein, the computer program mechanism comprising:
a loader/linker procedure that loads/links methods or procedures into the computer system's memory; each loaded method or procedure having an associated activation record; each method or procedure's activation record including a unique identifier associated with the method or procedure and zero or more parameters, each of the parameters having an associated data type and location in the activation record; wherein a subset of the parameters in the activation records for the loaded methods and/or procedures are object references having an object reference data type;
the loader/linker procedure including:
instructions for associating each loaded method or procedure with an entry in a table; and
instructions for storing in the table data for each loaded method or procedure, at the associated entry for the method or procedure, the stored data indicating where each of the object references, if any, are located in the activation record for the method or procedure;
a mutator task that stores objects in the computer system's memory;
an operating system that includes instructions for storing activation records in the program stack, including an activation record for each method or procedure invoked by the mutator task; and
a garbage collection procedure that processes the activation records stored in the program stack to identify object references therein, the garbage collection procedure including a root set locator procedure that includes:
instructions for locating the entry in the table that corresponds to the activation record being processed; and
instructions for identifying each of the object references in the activation record being processed in accordance with the data stored in the located table entry;
whereby objects stored in memory are efficiently identified from parameters in the activation records stored in the program stack.

16. The computer program product of claim 15, wherein
the unique identifier associated with each method or procedure is a unique invocation address assigned to the method or procedure when the method or procedure is loaded into memory;
the table entry associating instructions comprise instructions for applying a hash function to the method or procedure's invocation address so as to generate a value indicative of the table entry; and
the table entry locating instructions comprises instructions for applying the hash function to the invocation address in the activation record being processed so as to generate a value indicative of the table entry corresponding to the activation record being processed.

* * * * *